US006621978B1

United States Patent
Choi et al.

(10) Patent No.: US 6,621,978 B1
(45) Date of Patent: Sep. 16, 2003

(54) EPICYCLOIDAL LIGHT GUIDE AND ILLUMINATING FACILITY

(75) Inventors: Joon-Sik Choi, Seoul (KR); Hyung-Joo Kang, Kyoungki-Do (KR); Hyo-Sik Jeon, Kyoungki-Do (KR); Han-Seok Kim, Seoul (KR); Yong-Seog Jeon, Seoul (KR); Gennady (Inakh) Bukhman, Kiev (UA)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/688,239

(22) Filed: Oct. 16, 2000

(30) Foreign Application Priority Data

Jan. 22, 2000 (KR) .......................................... 2000-3091

(51) Int. Cl.[7] ................................................ G02B 6/00
(52) U.S. Cl. ........................ 385/146; 385/133; 385/901
(58) Field of Search .............................. 385/146, 901, 385/133, 125; 362/551, 554, 556; 65/403

(56) References Cited

U.S. PATENT DOCUMENTS

| 4,420,740 A | * 12/1983 | Brown et al. ............... 340/983 |
| 5,233,679 A | * 8/1993 | Oyama ....................... 385/146 |
| 5,333,090 A | * 7/1994 | Baumeister et al. ........ 359/584 |
| 5,715,347 A | * 2/1998 | Whitehead .................. 385/133 |

FOREIGN PATENT DOCUMENTS

DE         19640324 A         3/1998

* cited by examiner

Primary Examiner—Akm Enayet Ullah
Assistant Examiner—Mike Stahl
(74) Attorney, Agent, or Firm—Birch, Stewart, Kolasch & Birch, LLP

(57) ABSTRACT

The present invention relates to a light guide capable of transferring light from an illuminating apparatus to a certain distant destination. The light guide includes a light source, and a hollow guide unit extended from the light source and having a transparent lateral surface. The present invention provides a pipe shaped light guide having a cross section of an epicycloidal curve for enhancing power and a light emitting characteristic. In the present invention, light is transmitted using a light transmitting material or a prism at a portion of a cross section of the epicycloidal curve, and a reflection plate formed of a high reflection ratio is installed at the remaining portions of the cross section of the same. In addition, an expensive lens or prism is not used in the present invention thereby decreasing fabrication cost. It is possible to provide a high efficiency light guide. In particular, it is possible to improve illumination and energy efficiency characteristics by changing the type of the epicycloid or changing an optical parameter of a material which forms the wall surface of the light guide.

20 Claims, 6 Drawing Sheets

EPICYCLOIDAL LIGHT GUIDE AND ILLUMINATING FACILITY

BACKGROUND OF THE INVENTION

1. Field of the Invention

The present invention relates to a light guide capable of transferring light from an illuminating apparatus to a certain destination, and in particular to a light guide having an epicycloid cross section of a guide.

2. Description of the Background Art

Generally, an illuminating apparatus having a channel shape light guide capable of redistributing light from an illuminating apparatus through a lateral surface is directing to illuminating light to a wall surface of a guide based on a light flux which is smaller than an illuminating apparatus which does not have a light guide. The channel shape light guide must satisfy the following condition for being effectively used for various illuminating purposes.

1. The distributing of a light flux emitted to a guide must provide a necessary distribution of an illuminating parameter which requires a constant property and amount for an illuminated object in a direction and angle.

2. The power consumption must be prevented compared to other illuminating unit.

3. A certain gain must be obtained compared to other technical unit in view of cost.

As an illuminating apparatus having a channel type light guide, in a plurality of patents which are not actually used in all types of illuminating apparatuses, a front portion of a light guide is formed in a circle (concluding a certain convex portion) or polygonal shape for optical and structural schemes of a channel light guide. A light reflection unit having a lamp is formed in circle and is aligned with a hole of a channel type light guide.

A circular and polygonal light guide channel do not provide effective distribution of the emission through the stretch part of the light guide irrespective of a material used for a light guide having a mirror reflection or transparently prismatic or light scattering effect. In addition, a light distribution characteristic which must be changed in accordance with various applications cannot be changed. A plurality of patents concerning geometrical variations of prisms along the length of a light guide, a modification of a light guide, and a light emission parameter cannot optimize an illuminating apparatus under a required conditions.

It is necessary to concentrate (compress) scattered light from a light guide at a certain portion. In order to overcome the above-described problem, a method was suggested that alternately arranged a plurality of lenses in the longitudinal direction of the light guide and changed the optical characteristic of a light guide wall.

FIGS. 1A and 1B illustrates a prism installed at a wall surface of a light guide having a circular cross section. As shown in the structure of a light guide of FIG. 1A, a reflection cover is installed around a bulb 3 for concentrating light from the bulb 3 at a certain front portion, and a guide 1 is connected to transfer the light to a certain destination at the front surface of the reflection cover. A cap 2 is engaged at the end of the guide. As shown in FIG. 1B which illustrates the cross section of the light guide, the shape of the cross section is circular, and an engaging portion 5 is formed at the upper portion of the same. The guide is formed of an external guide 4 and an internal guide 9. The inner material is formed of a structured prism. FIGS. 2A and 2B illustrate the shape of the prism. As shown in FIGS. 2A, an isosceles triangle is continuously formed on the prism thin film, and FIG. 2B illustrates the size of the same. The guide using the prism is capable of fully-reflecting the light inputted at a certain angle. FIG. 2C is a perspective view illustrating a part of the guide having the prism.

However, it is practically impossible to basically overcome the problems of a channel type light guide by changing the optical characteristic of a light guide wall alternately arranging the lenses or using the prism. The above-described problem overcoming method may increase the cost of the channel type light guide. Therefore, the structure of the light guide channel and the optical connection with the light radiating unit must be improved.

SUMMARY OF THE INVENTION

Accordingly, it is an object of the present invention to provide a light guide capable of increasing efficiency and reducing fabrication costs without using a lens or prism like the conventional light guide.

In order to achieve the above object, in the present invention, the epicycloid type light guide is provided such that a cross-section of the guide is formed in a pipe shape having an epicycloid curve.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The present invention relates to an illuminating apparatus comprising a light source, and an empty guide unit extended from the light source and having a transparent part. The present invention includes a pipe shaped light guide having a cross section having an epicycloidal curve for improving power and a light emitting characteristic. Light is passed through using a certain material or prism at a certain portion of the epicycloidal cross section, and a reflective plate of a high reflection ratio is formed at the remaining portions.

In addition, a conical reflection plate may be installed at a certain distance from a lamp in the light guide. The reflection plate is formed in a conical shape and has the same number of branches as the number of the branches of the epicycloid curve of the guide cross section.

The epicycloid is defined as a path at which a point of a circle passes through when a certain circle is drawn around the fixed circle. Therefore, various curves are formed based on the radius of the fixed circle, and it is possible to form various curves in accordance with the size of the radius of the fixed circle and that of the rotating circle. Assuming that the radius of the fixed circle is "a", and the radius of the rotating circle is "b", and the angle is "t", the parameter equation of the epicycloid is as follows:

$$X=(a+b)\cos(t)-b\cos((a/b+1)t)$$

$$Y=(a+b)\sin(t)-b\sin((a/b+1)t)$$

Figure 1A:
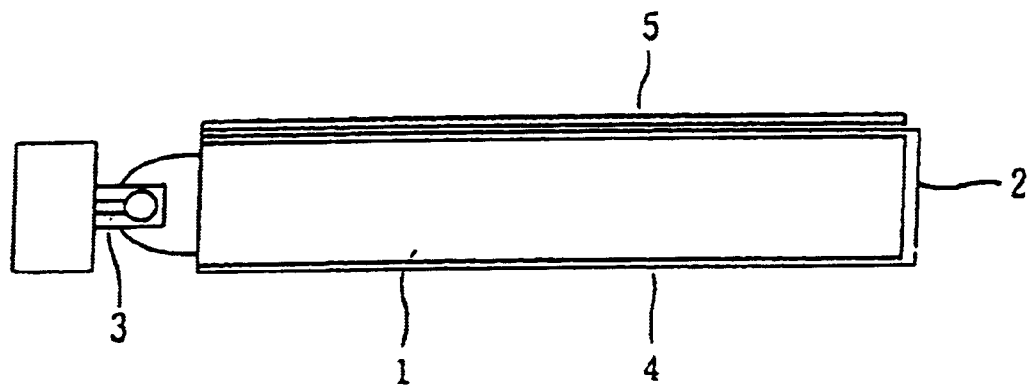
FIG. 1A is a vertical cross-sectional view illustrating the construction that a prism is formed on a light guide wall surface having a circular cross section in the conventional art.
Figure 1B:
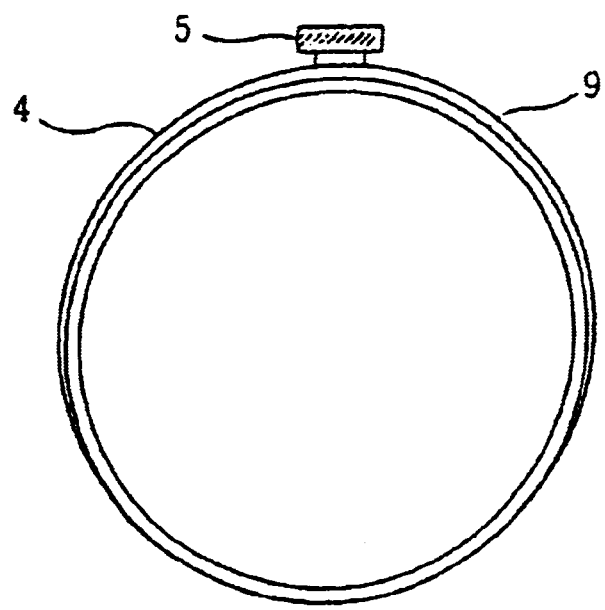
FIG. 1B is a horizontal cross-sectional view illustrating the shape of a light guide cross section of FIG. 1A.
Figure 2A:
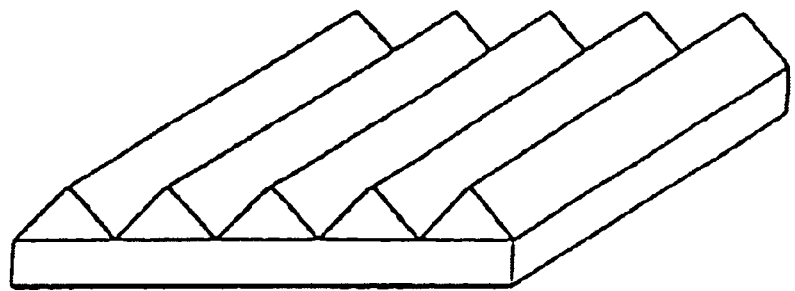
FIG. 2A is a perspective view illustrating a structure of a prism of a light guide cross section of FIG. 1A.
Figure 2B:
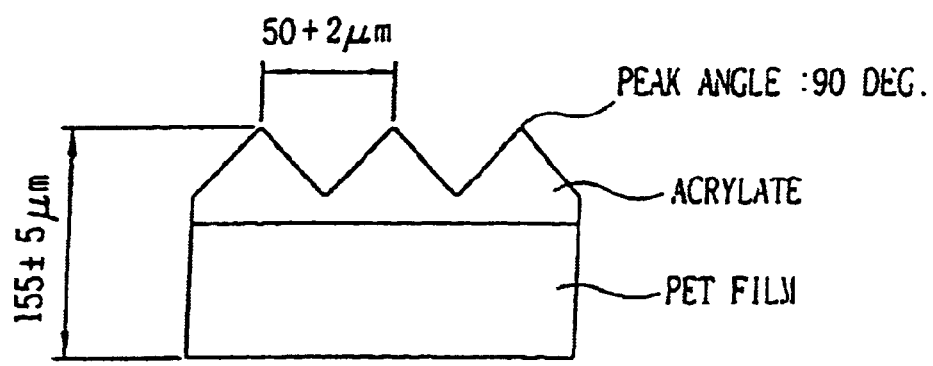
FIGS. 2B is a cross-sectional view illustrating the size of a prism of FIG. 2A.
Figure 2C:
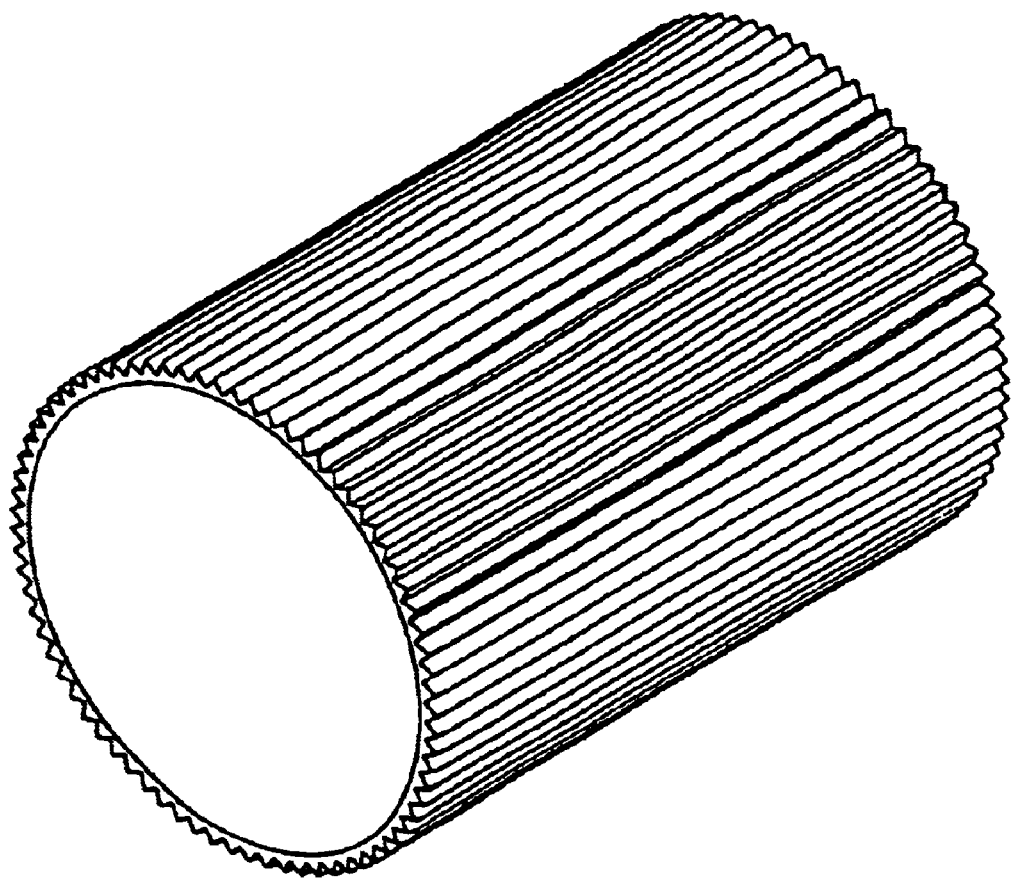
FIG. 2C is a perspective view illustrating a light guide having a prism of FIG. 2A.
Figure 3:
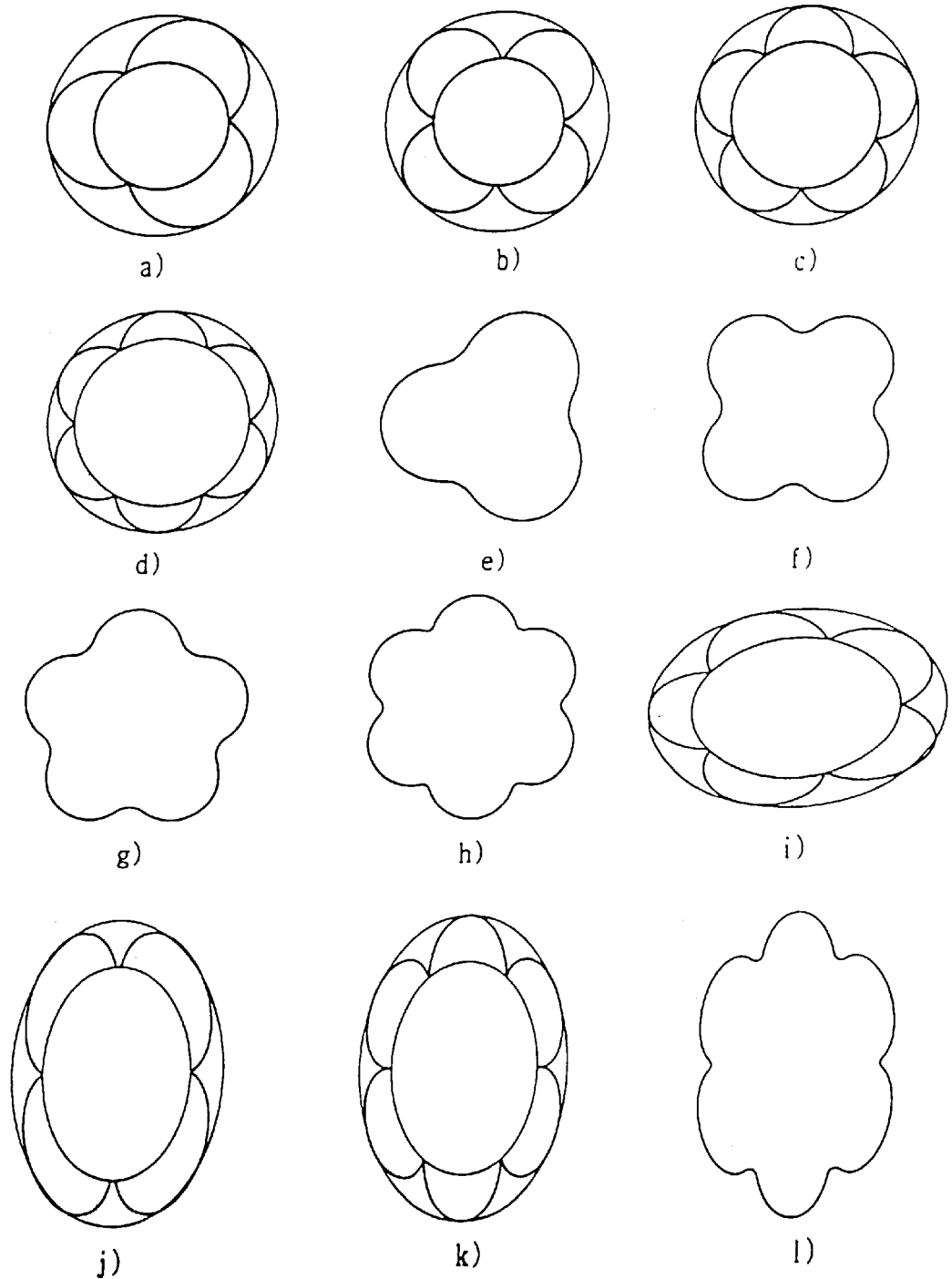
FIG. 3 is an illustrative view of various shapes of an epicycloidal curve.

FIG. 3 illustrates various epicycloidal curves. Most epicycloidal curves are formed in the shape of flower leaf. Defining a semi-circular arc as a branch, the number of branches is 3 through 6, and there may be more than 3 to 6 branches. FIG. 3 illustrates a circular shape and ellipse epicycloid (Refer to i through 1). In the present invention, the circular epicycloid having 5 branches is basically used. In a preferred embodiment of the present invention, the number of the branches and the basic types of the same may be variously changed in accordance with the purpose of use of the light guide and fabrication conditions.

The light guide having various cross sections in an epicycloid curve shape has the following conditions:

1) The reflection amount of the wall of the light guide channel is decreased, and the moving path of the sequential reflections is decreased.

2) A caustic domain is formed in a propagating direction of the light flux at the light guide, and the light is compressed in the axial direction of the channel.

3) The above-described conditions 1 and 2 may be changed by changing the shape of the epicycloid or a light parameter of a material forming the light guide wall.

4) The fabrication cost is decreased, and the illuminating technical characteristic and energy characteristic are improved.

The above-described conditions are major conditions required for overcoming the problems of an illuminating apparatus having a conventional hollow light guide:

The optical design formed of a cylindrical light guide of the epicycloid may be implemented in various ways. The hollow cylindrical channel of the light guide has a radius which forms the epicycloid, the number "m" of the epicycloid branches, various shapes based on the length L of the channel which is optically near the light entry apparatus, and a geometric parameter. The shape of the epicycloid may be extended or short, so that it is possible to implement a lot of change in the light guide based on various variations of the material type and the parameter.

Figure 4:
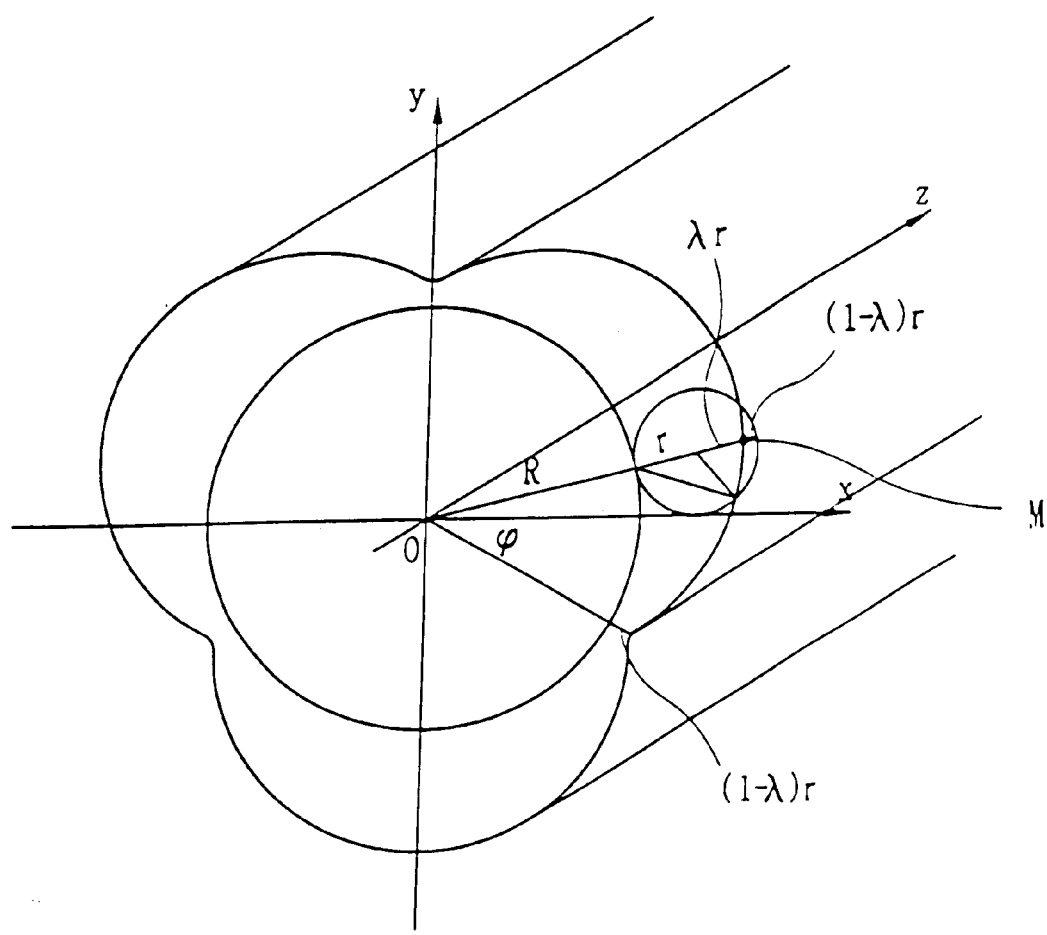
FIG. 4 is an illustrative view of a parameter equation of an epicycloidal circular cylinder according to the present invention.

In view of the technical points, it is preferred to select the decreased epicycloid which is illustrated as a point M distanced by a distance of $\lambda \cdot r$ (where $\lambda<1$) from the center of the radius "r", not on the circle which forms the epicycloid as shown in FIG. 4. The cylindrical parameter equation of the epicycloid with respect to the axis z is as follows:

$$x=r[(1+m)\cos \phi - \lambda \cos(1+m)\phi]$$
$$y=r[(1+m)\sin \phi - \lambda \sin(1+m)\phi] \qquad (1)$$
$$z=z$$

where each parameter $\phi$ has a range of $0-2\pi$.

If each branch of the epicycloid is a cycloid, the light which is mirror-reflected from the wall of the light guide or has an internal full reflection satisfies the above-described relationship between an incident angle and a reflection angle. In major features of the epicycloid type light guide, the envelope of all normal lines with respect to a tangent line at each point of the incident beam becomes a hypocycloid and may be expressed as follows:

$$x=r[(1-m)\cos \phi + \lambda \cos(1-m\phi)]$$
$$y=r[(1-m)\sin \phi - \lambda \sin(1-m\phi)] \qquad (2)$$
$$z=z$$

The above-expressed Equation (2) is valid with respect to the hollow light guide which is formed based on an epicycloid combination of the branches formed at a closed curve like a Cassini's oval. Oval light guide is shown in FIG. 3(j). The branches are a combination of the epicycloid wherein m=3,4,5,6,(FIG. 3(1)). The above-described light guide is called as a combined epicycloid light guide. An edge effect which causes multiple reflections of light is decreased at a usual light guide as well as a combined light guide, and expansion of ineffective light is decreased. The concentration of the reflection beam (convergence) increases a path between the reflection rays which alternately decrease the energy loss during the reflection operation. As the radius of the light guide envelope is decreased, the concentration of the reflection beam is increased.

The propagation characteristic of the light at the epicycloid type light guide is that a concentration of the light is obtained at the caustic region of the center of the light guide. The envelope of the caustic region is a hypocycloid. The type of the same has a similarity constant K-R/(R-2r) and is similar to the epicycloid rotated at the same center by $\pi/K$. In this case, all of the center portion beam is reflected and is inputted into a slit at the epicycloid type light guide (in particular, the number of branches is an odd number) compared to the circular light guide in which of the center beam collides with the reflection light before it reaches the slit, so that the efficiency is increased.

Figure 5A:
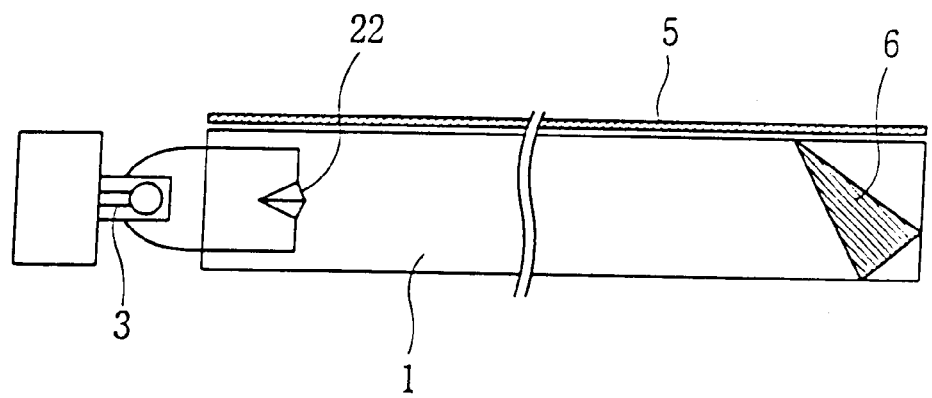
FIG. 5A is a cross-sectional view illustrating an embodiment of a light guide according to the present invention.
Figure 5B:
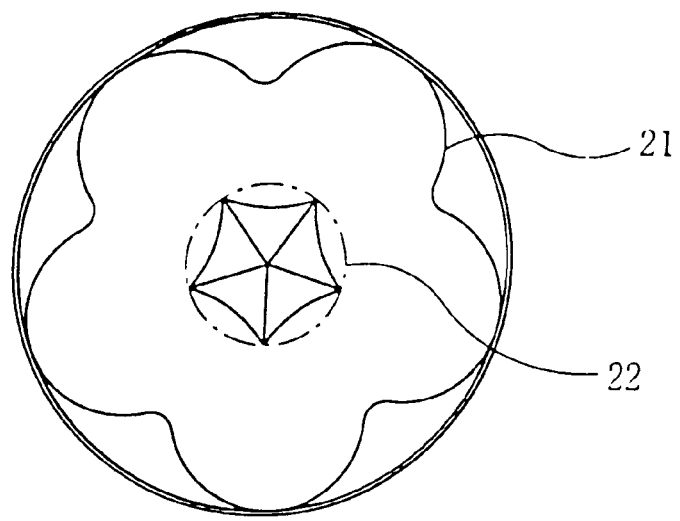
FIG. 5B is a horizontal cross-sectional view illustrating a cross section of a light guide of FIG. 5A.

FIGS. 5A and 5B illustrate an embodiment of the light guide having an epicycloidal curve in a cross section shape. As shown in FIG. 5A, a reflection cover is installed to surround a bulb for concentrating light from the bulb 3 at a front portion of the illuminating apparatus. A guide 1 is connected at the front surface of the reflection cover for transferring the generated light to a certain distant destination. The cross section of the guide 1 has an epicycloidal curve shape, not a circle shape. A jig 6 is installed at an end of the guide. FIG. 5B illustrates a detailed cross section. In this case, an epicycloid surface 21 having five branches is formed for thereby fabricating a guide. At this time, the parameter equation is as follows:

$$x=150\cos(t)-20\cos(6t)$$

$$y=150\sin(t)-20\sin(6t)$$

Another feature of the present invention is that a high temperature-resistant reflection plate 22 is installed at a front portion of the reflection cover compared to the conventional art. The reflection plate 22 is conically formed in an epicycloid type differently from the guide 1 and has five branches. The parameter equation of the reflection plate 22 is as follows.

$$x=75\cos(t)+10\cos(6t)$$

$$y=75\sin(t)-10\sin(6t)$$

Therefore, in the present invention, since the cross sections of the guide 1 and the reflection plate 22 are formed in an epicycloid type, so that light outputted from the illuminating apparatus is effectively transferred to a certain destination.

As described above, the present invention, an expensive lens and prism are not used for decreasing the fabrication cost, so that it is possible to fabricate a high efficiency light guide. In particular, it is possible to improve illumination and energy efficiency characteristics by changing the type of the epicycloid or changing an optical parameter of a material which forms the wall surface of the light guide.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A light guide having a longitudinal axis, comprising:
  a plurality of curved wall sections with reflective inner surfaces, each curved wall section extending along the longitudinal axis to form a hollow body,
  the hollow body having a hollow transverse cross-section defined by an epicycloid curve centered on the longitudinal axis, the hollow transverse cross-section allowing light to be reflected towards a caustic region being formed around and along the longitudinal axis within the hollow body.

2. The guide of claim 1, wherein the hollow body is formed by at least three curved wall sections.

3. The guide of claim 1, wherein a transverse cross-section of the caustic region is circular.

4. The guide of claim 1, wherein a transverse cross-section of the caustic region is elliptical.

5. The guide of claim 1, further comprising a light passing means and/or a light reflecting means in the hollow body for passing and/or reflecting light along the longitudinal axis of the hollow body to facilitate light emission exiting via a portion of the light guide.

6. An illumination apparatus, comprising:
  a light source; and
  a hollow pipe-shaped light guide receiving light from the light source at one end thereof, the light guide having lateral walls with portions being light transmissive and portions being light reflective, and a transverse cross-section defined by an epicycloid curve.

7. The apparatus of claim 6, further comprising a light reflection member positioned at the one end of the light guide for reflecting the light received from the light source through the light guide to facilitate light radiance exiting the light transmissive lateral wall portion.

8. The apparatus of claim 7, wherein the lateral walls are formed by a plurality of curved segments, and the light reflecting member has an equal number of curved segments as that of the lateral walls.

9. The apparatus of claim 6, wherein the lateral walls are formed by at least three curved segments.

10. The apparatus of claim 6, wherein the light reflective lateral walls allow light to be reflected towards a caustic region being formed around and along the longitudinal axis within the hollow body, where the transverse cross-section of the caustic region is circular.

11. The apparatus of claim 6, wherein the light reflective lateral walls allow light to be reflected towards a caustic region being formed around and along the longitudinal axis within the hollow body, where the transverse cross section of the caustic region is elliptical.

12. The apparatus of claim 6, further comprising a light passing means and/or a light reflecting means in the hollow body for passing and/or reflecting light along a longitudinal axis of the hollow body to facilitate light emission through the light transmissive lateral walls.

13. A light guide having a longitudinal axis, comprising:
  a plurality of curved walls, each wall having an inner surface being convex with respect to the longitudinal axis, the walls being elongated parallel to the longitudinal axis and having a curvature defined by an epicycloidal curve,
  the curved walls forming a hollow epicycloidal cylinder body having a first end for receiving light, a second end opposing the first end, and a hollow transverse cross-section being epicycloidal in shape, which allows light to be redirected towards a caustic region being formed around and along the longitudinal axis within the hollow body.

14. The light guide of claim 13, further comprising a reflective inner surface portion of at least one curved wall for re-directing the received light towards another portion of the same curved wall or towards a different curved wall.

15. The light guide of claim 14, wherein the curved walls having the reflective inner surface portion thereon re-direct the light through the light guide, so that the re-directed light exits the light guide through a portion of the curved walls having no reflective inner surface portion thereon.

16. The light guide of claim 15, further comprising a reflecting means at the second end for reflecting all re-directed light reaching the second end back toward the first end of the light guide.

17. The light guide of claim 14, wherein all the curved walls have reflective entire inner surfaces that re-direct all light received at the first end towards the second end, so that the re-directed light only exits the light guide through a slit formed at the second end.

18. The light guide of claim 13, further comprising a reflector at the first end of the light guide, the reflector having outer surfaces being concave with respect to the longitudinal axis.

19. The light guide of claim 18, wherein the reflector is conical in shape with its point being pointed towards the light source, and the reflector has a transverse cross-section being hypocycloidal in shape.

20. The light guide of claim 14, wherein the caustic region has a transverse cross section shape that is circular or elliptical.

* * * * *